(12) United States Patent
Lutter

(10) Patent No.: US 6,979,407 B2
(45) Date of Patent: *Dec. 27, 2005

(54) PROCESS FOR PRODUCING AN SPM SENSOR

(75) Inventor: Stefan Lutter, Nauchâtel (CH)

(73) Assignee: Nanoworld AG, Neuchatel (CH)

( * ) Notice: Subject to any disclaimer, the term of this patent is extended or adjusted under 35 U.S.C. 154(b) by 194 days.

This patent is subject to a terminal disclaimer.

(21) Appl. No.: 10/385,088

(22) Filed: Mar. 10, 2003

(65) Prior Publication Data

US 2003/0196988 A1 Oct. 23, 2003

(30) Foreign Application Priority Data

Mar. 20, 2002 (EP) .................................. 02006268

(51) Int. Cl.⁷ ............................................. H01L 21/00
(52) U.S. Cl. .................. 216/11; 216/2; 216/99; 438/745; 438/753; 250/306; 73/105
(58) Field of Search ............ 216/2, 11; 250/306; 73/105; 438/745, 753

(56) References Cited

U.S. PATENT DOCUMENTS

| | | | |
|---|---|---|---|
| 5,021,364 A | | 6/1991 | Akamine et al. |
| 5,386,720 A | | 2/1995 | Toda et al. |
| 5,811,017 A | * | 9/1998 | Matsuyama .................. 216/11 |
| 5,838,005 A | * | 11/1998 | Majumdar et al. .......... 250/306 |
| 5,907,095 A | * | 5/1999 | Lin ............................. 73/105 |
| 6,148,662 A | | 11/2000 | Lin |
| 2004/0046119 A1 | * | 3/2004 | Lutter ....................... 250/306 |

FOREIGN PATENT DOCUMENTS

| | | | |
|---|---|---|---|
| EP | 0 413 042 | | 2/1991 |
| EP | 0 468 071 | | 1/1992 |
| JP | 08262040 | | 10/1996 |
| JP | 08313541 | | 11/1996 |
| JP | 09105755 | | 4/1997 |
| JP | 10-90287 | * | 4/1998 |
| WO | WO97/44631 | | 11/1997 |

* cited by examiner

Primary Examiner—Shamim Ahmed
(74) Attorney, Agent, or Firm—Bachman & LaPointe, P.C.

(57) ABSTRACT

Process for producing an SPM sensor having a holding element, a cantilever and a sensor tip which projects out of the surface of the cantilever and is delimited by three surfaces. According to the process, the starting material used is a (100)-silicon wafer. The main patterning process steps are carried out on the wafer back surface, so that an SPM sensor can be produced at low cost in a single batch run.

7 Claims, 5 Drawing Sheets

PROCESS FOR PRODUCING AN SPM SENSOR

BACKGROUND OF THE INVENTION

The present invention relates to a process for producing an SPM sensor having a holding element, a cantilever and a sensor tip which projects out of the surface of the cantilever and is delimited by three surfaces at the free end of the cantilever.

Scanning probe microscopes (SPMs) are generally known and are used in practice to scan the surface of specimens using fine sensors of atomic resolution. SPMs include what are known as STMs (Scanning Tunneling Microscopes) and AFMs (Atomic Force Microscopes), which are likewise generally known.

All these known microscopes use sensors which comprise a micro-scale bending bar, referred to below as the cantilever, which at one end has a holding element and at the other end has a sensor tip, by means of which the specimen is scanned. This sensor tip, which is arranged at the free end of the cantilever, may be shaped in such a way that it does or does not project beyond the free end. The particular sensors used depends on installation in the corresponding microscope; there are situations in which the tip in the microscope is covered, so that alignment can only be carried out with difficulty.

SPM sensors of the type described above are known, for example, from U.S. Pat. No. 5,811,017. In this case, the starting material is a composite material comprising silicon on an insulator (Silicon on Insulator (SOI)), in which at least three lithography steps are required in order to fabricate an SPM sensor with holding element, rectangular cantilever and sensor tip made from silicon. The use of SOI materials as starting material is significantly more expensive than monocrystalline silicon. In this process, an expensive single-wafer dry-etching process is required for fabrication of two of the three surfaces which delimit the sensor tip.

U.S. Pat. No. 5,021,364 has likewise disclosed an SPM sensor, in which a silicon sensor tip is arranged, for example, on a nitride cantilever. The cantilever material is deposited and is therefore not a bulk material. In this case too, expensive single-wafer dry-etching processes are used to etch through the silicon membrane and to fabricate a cantilever or two of the three surfaces which delimit the sensor tip.

The present invention is based on the object of Proposing a further possible way of producing an SPM sensor, in which the latter can advantageously be produced in a single batch run.

SUMMARY OF THE INVENTION

The foregoing object is achieved by providing a process for producing an SPM sensor having a holding element, a cantilever and a sensor tip which projects out of the surface of the cantilever and is delimited by three surfaces. According to the process, the starting material used is a (100)-silicon wafer. The main patterning process steps are carried out on the wafer back surface, so that an SPM sensor can be produced at low cost in a single batch run.

A particular feature of the process consists in the fact that the production process is carried out starting from a monocrystalline (100)-silicon wafer, and therefore the entire production process can take place in a single batch run.

Furthermore, compared to the prior art only a few dry-etching processes and more inexpensive wet-chemical etching processes are carried out. Especially compared to the prior art, a rectangular cantilever is produced by a wet-chemical etching process and does not have to be patterned dry. The patterning, i.e. the application of the mask and the shaping (lithography steps), takes place exclusively from a single side of the wafer, namely the opposite side from the sensor tip, i.e. the wafer underside. The top side of the wafer is understood to mean the side on which the sensor tip is formed. Accordingly, the opposite side is the underside of the wafer. In the present context, thinning steps are not understood to mean shaping steps. The shaping of the wafer top side is restricted to a thinning step carried out over the entire surface, which is used to set the thickness of the cantilever and during which the sensor tip is formed.

BRIEF DESCRIPTION OF THE DRAWINGS

The invention is explained in more detail below in conjunction with the accompanying drawings wherein.

DETAILED DESCRIPTION

Figure 1:
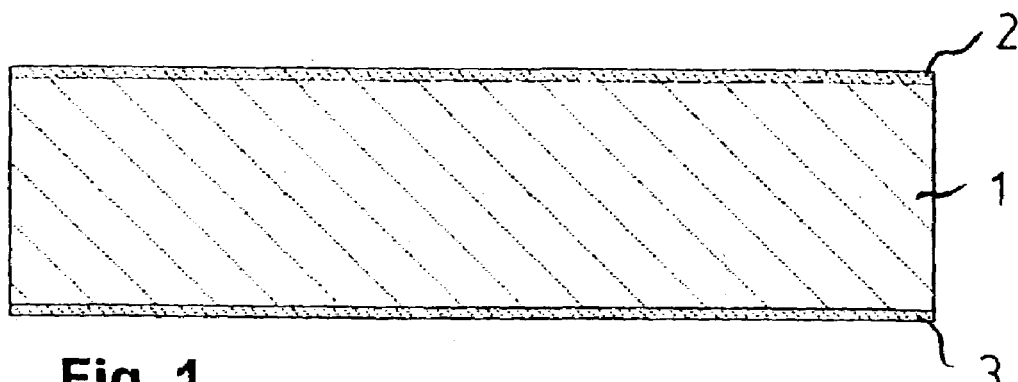
FIGS. 1 thru 10 show the individual steps of the process of the present invention.

FIG. 1 shows a (100)-silicon wafer 1 with a thickness of approx. 300 to 500 μm, the top side of which is covered with a silicon oxide layer 2 and the underside of which is covered with a silicon oxide layer 3, for example by thermal oxidation, these layers having a thickness of a few 100 nm.

Figure 2:
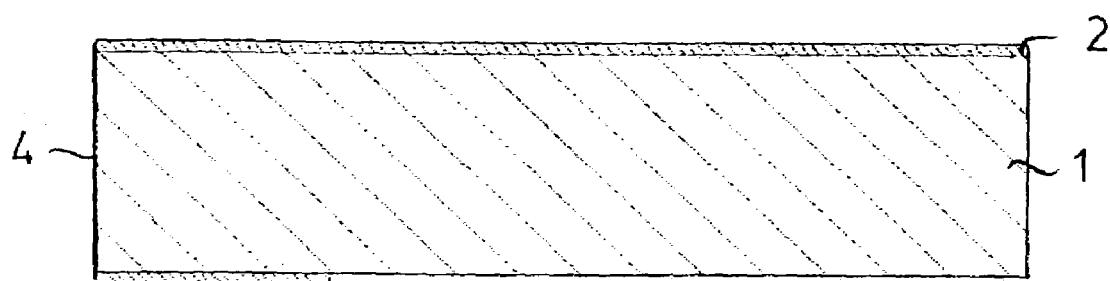

Next, a mask for production of the holding element 4 is fabricated by photolithography. For this purpose, a photoresist is applied to the wafer underside and patterned. Then, the silicon oxide layer 3 on the wafer underside is removed at the uncovered locations, so that only the region 5 remains in place on the wafer underside. The wafer top side had previously been covered by a protective resist. All the photoresists are removed again after the photomask has been transferred into the silicon oxide. These are generally standard, conventional processes. By way of example, in this case the photoresist is applied by the spinning process and is removed by means of standard solvents. The silicon oxide layer is removed by means of buffered hydrofluoric acid (HF). The result is illustrated in FIG. 2.

Figure 3:
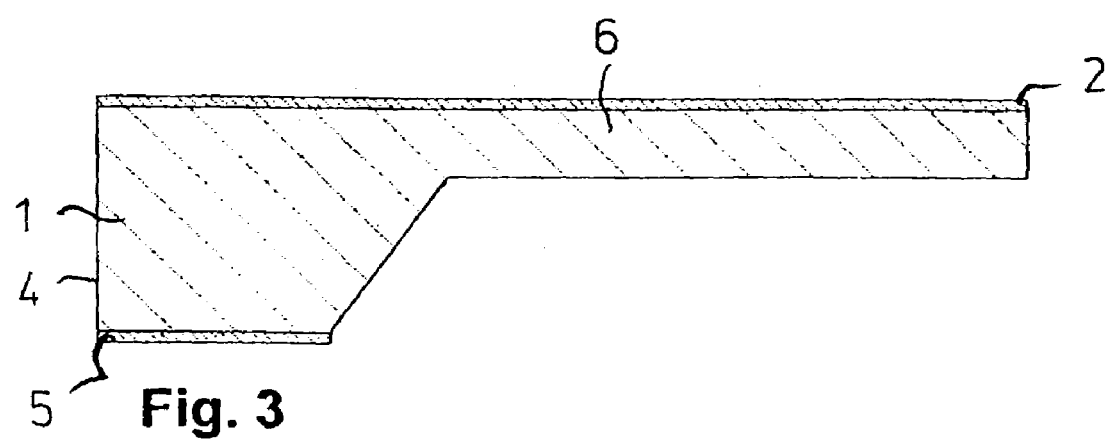

In the next step, which is shown in FIG. 3, a wet-chemical etching process, for example by means of aqueous potassium hydroxide (KOH) solution, is used to thin the substrate material from the wafer underside and thereby to produce the holding element 4. The thickness of the silicon membrane 6 which is formed in the process is selected in such a way that it at least corresponds to the sum of the desired height of the sensor tip which is to be formed and of the desired final thickness of the SPM sensor cantilever which is to be formed.

Figure 4:
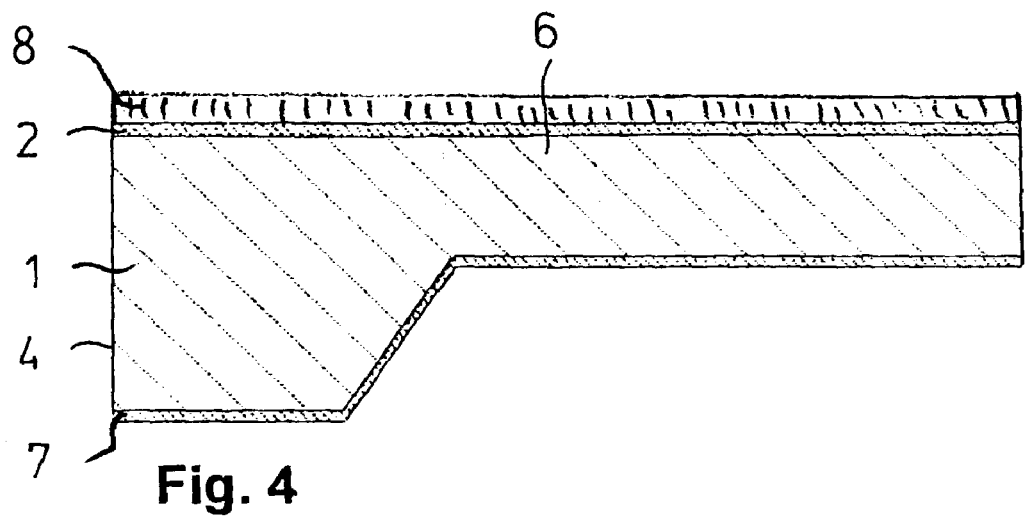

Next, both sides of the wafer are oxidized, and a silicon nitride layer is applied to the wafer top side in a PECVD (Plasma Enhanced Chemical Vapor Deposition) process. In FIG. 4, the silicon oxide layer on the underside is denoted by reference numeral 7, and the silicon nitride layer on the top side is denoted by reference numeral 8.

Figure 5:
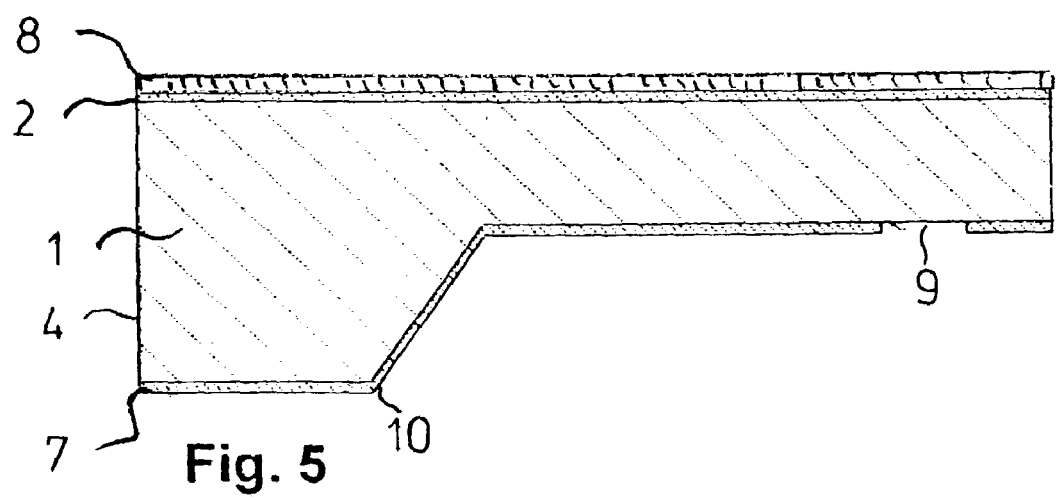
Figure 5A:
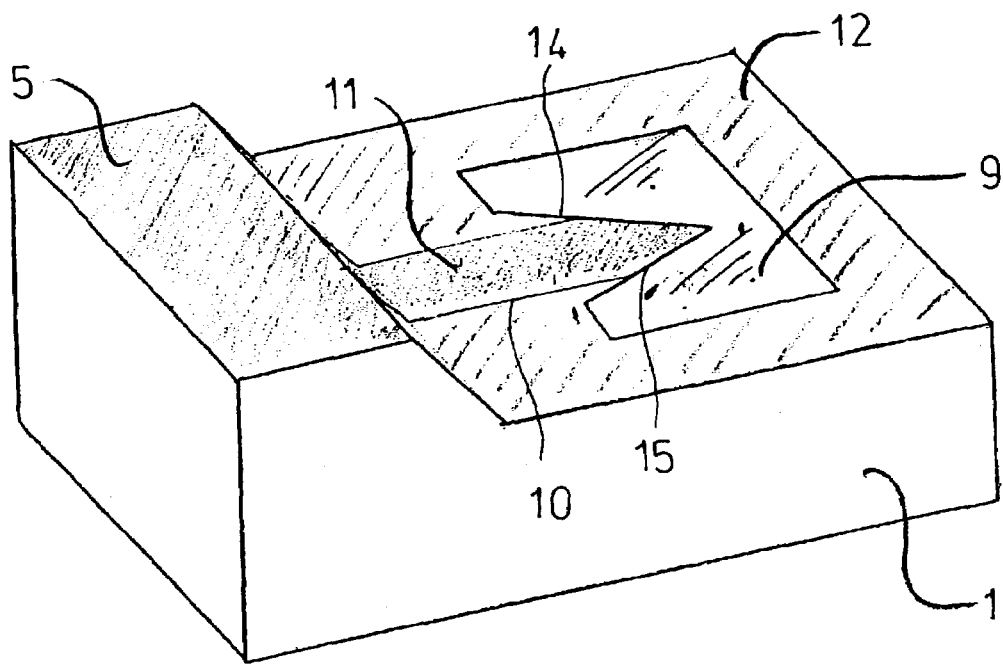

Next, a mask is fabricated for the purpose of producing boundary surfaces of the free end of the cantilever which is to be formed, these surfaces simultaneously defining two faces of the sensor tip which is to be produced. For this purpose, a photoresist is applied to the pre-patterned wafer underside and is patterned. In the exemplary embodiment, the photoresist is applied in a spray-coating process and is patterned by means of projection lithography. In principle, however, other known measures are also possible. The photomask is transferred to the silicon oxide layer 7, so that partial removal takes place in the region 9. The silicon nitride layer 8 on the top side of the wafer is thinned slightly in the process. Then, the photoresist is removed. Next, the mask for production of the cantilever is fabricated as a result of a photoresist once again being applied to the pre-patterned wafer underside and being patterned in accordance with the desired shape. In this case too, the application is preferably carried out using the spray-coating process and the patterning is preferably carried out by means of projection lithography. Then, this photomask is likewise transferred to the silicon oxide layer 7, so that the silicon oxide is partially thinned. Then, the photoresist is removed. As a result, a step is formed in the silicon oxide layer on the underside. In this context, FIG. 5a shows a perspective view of the wafer underside with the silicon oxide layer 7, which has various thickness regions, with the result that the step 10 in FIG. 5 is formed. The regions 5 and 11 are thicker than the remaining region 12. The region 9 is uncovered silicon.

Figure 6:
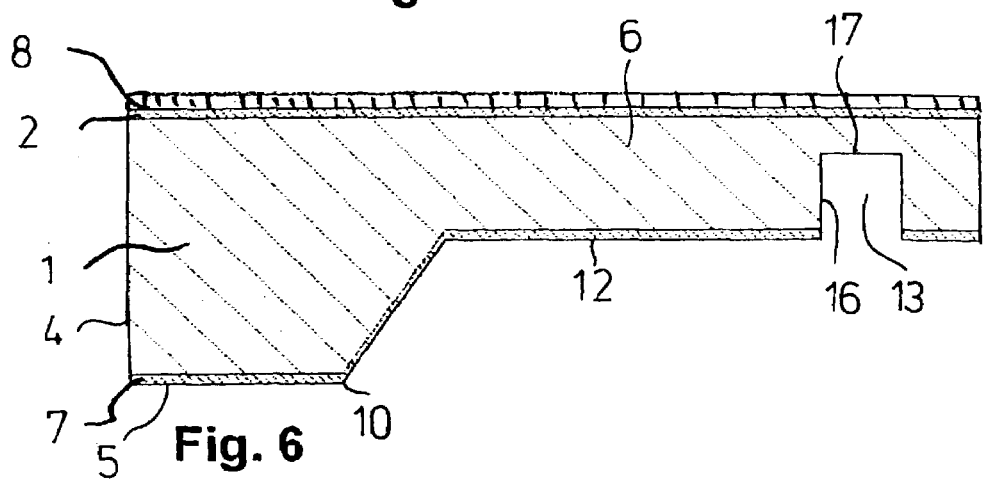

The next process step is a deep silicon etch, preferably using the known ASE (Advanced Silicon Etching) process, producing vertical side walls on the back surface of the silicon wafer 11, so that a recess 13 is formed in the silicon membrane 6 in the region 9 shown in FIG. 5. The etching mask used is the above-described silicon oxide mask for production of the boundary surfaces 14 and 15 (FIG. 5a) of the free end of the cantilever which is to be formed. The depth of the recess 13 at least corresponds to the sum of the desired height of the sensor tip to be formed and the thickness of the SPM sensor cantilever to be formed. The thickness of the silicon membrane 6 is selected in such a way that the silicon membrane is not completely etched through in this step, as shown in FIG. 6.

Figure 7:
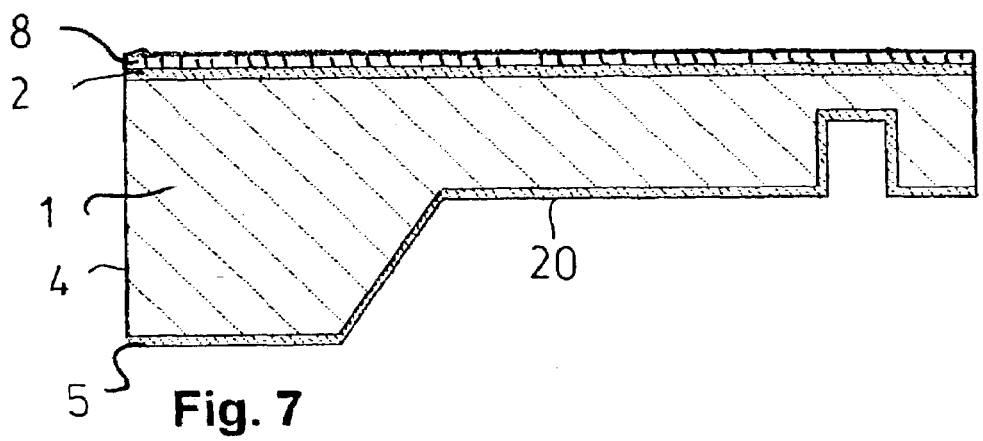

Then, the silicon wafer is oxidized on the wafer underside, during which step the side walls 16 and the base surface 17 of the recess 13 are covered by silicon oxide 20 (FIG. 7).

Figure 7A:
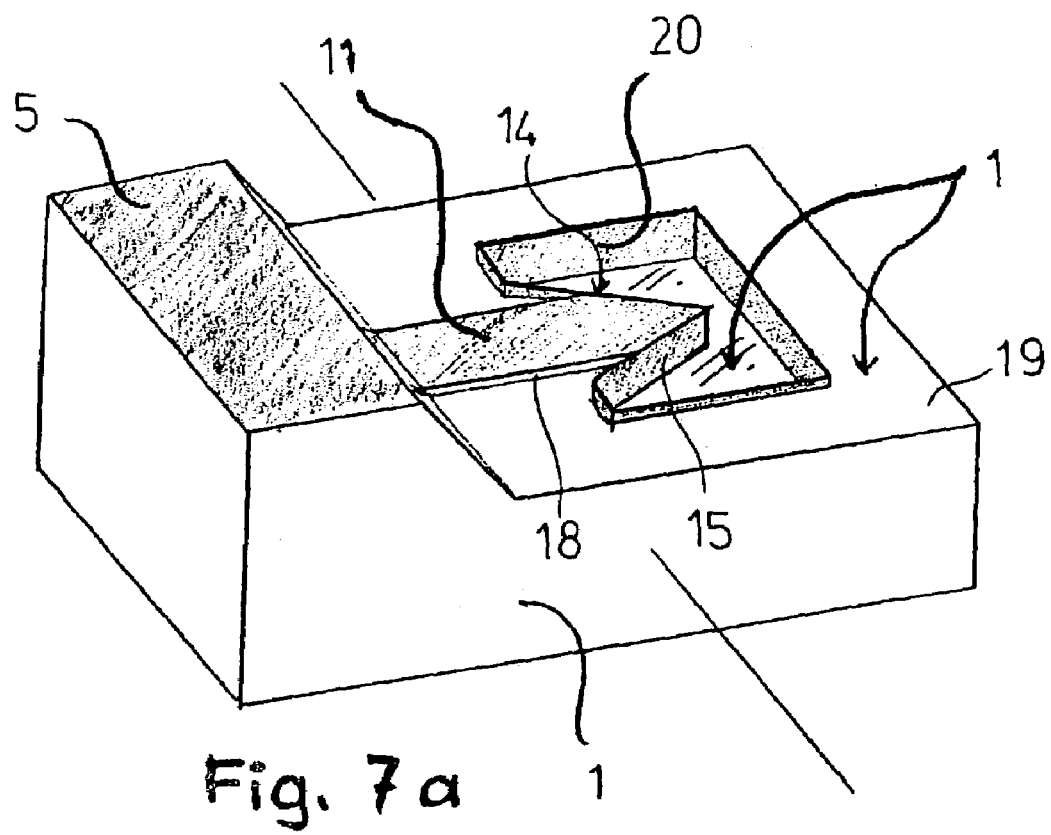
Figure 7B:
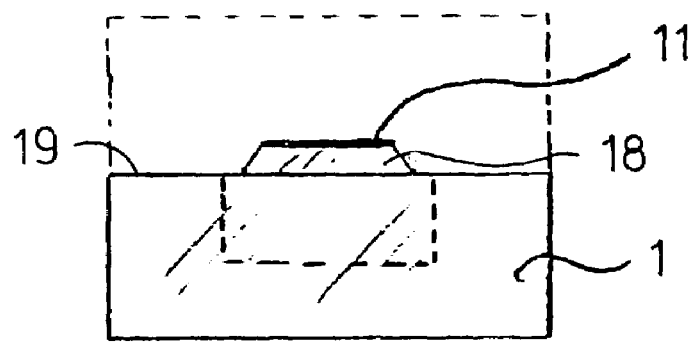

Next, the wafer underside is subjected to a targeted dry-etching process, which operates selectively with respect to silicon, and the silicon oxide layer on the base surface 17 of the recess 13 and also in the region 12 (FIG. 5a) is removed. In the process, the cantilever mask is transferred to the underside of the wafer. This is followed by a wet-chemical etching step, for example carried out by means of KOH, in which a cantilever 18 is pre-patterned on the basis of the mask which has just been transferred. The etching depth and therefore the thickness of the pre-patterned cantilever 18 is selected to be greater (for example by 20%) than the final cantilever thickness of the SPM sensor to be produced. The result of this operation is illustrated in FIGS. 7a and 7b, FIG. 7a showing the underside of the silicon substrate with a cantilever 18 which rises up from the surface 19 of the substrate material and has the perpendicular surfaces 14 and 15. FIG. 7b shows a sectional illustration. The surfaces 14 and 15 are covered with a silicon oxide layer. The silicon oxide layer 11 is also present on the cantilever 18.

Figure 8:
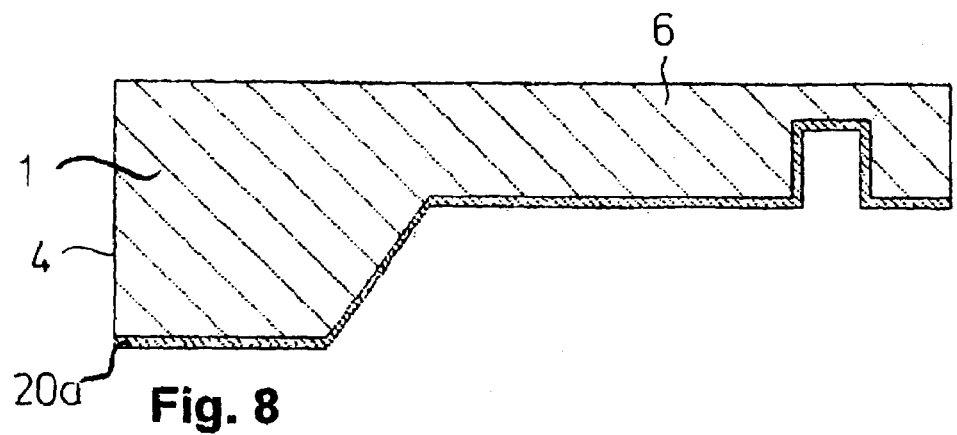

Then, all the oxide and nitride layers 2, 20 and 8 are removed in hydrofluoric acid. Then, a further oxidation step is carried out, in order to completely cover the underside of the wafer with a silicon oxide layer 20a. Then, the silicon oxide layer 2 on the top side of the wafer is removed by means of a dry-etching step which is chosen to be selective with respect to silicon. The result of this operation can be seen from FIG. 8.

Figure 9:
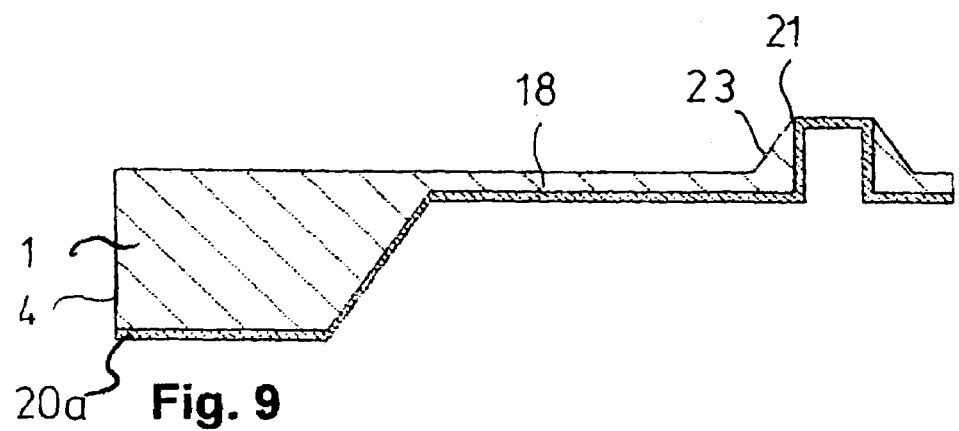

Finally, the wafer 1 is subjected to a wet-chemical etching step. In the process, the silicon membrane 6 is thinned from the top side of the wafer. This process is stopped when the pre-patterned cantilever 18 has been thinned to the desired thickness. A tip 21 has formed on the open side, which is not covered by silicon oxide, of the cantilever 18, this tip being defined by the surfaces 14 and 15 and a (111)-crystal plane 23. The height of the tip 21 corresponds to the recess 13 (FIG. 9) and is typically 5–25 μm. The thickness of the cantilever 18 is typically 0.5–10 μm.

Figure 10:
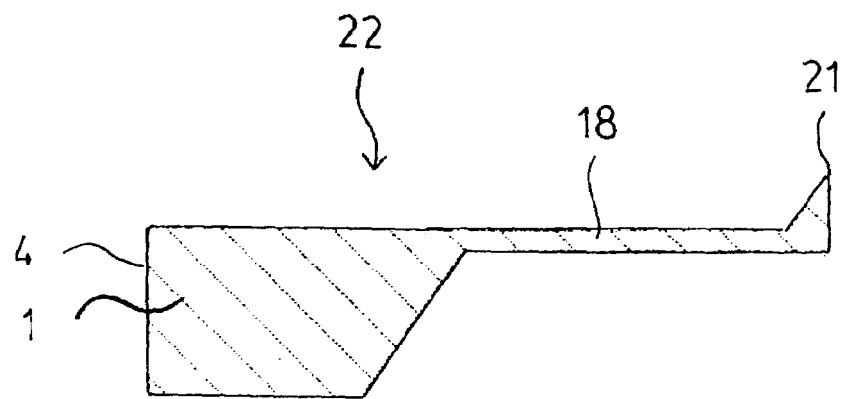

Finally, the remaining silicon oxide layers are removed by wet-chemical means, so that an SPM sensor 22, as illustrated in FIG. 10, having a holding element 4, a cantilever 18 and a sensor tip 21 is formed. The tip which has been formed can be sharpened by means of a further low-temperature oxidation, for example carried out at below 1000° C., and final removal of the oxide layer which has grown on.

The materials which are preferred in connection with the process described above can also be replaced by materials which have a corresponding action and with which the person skilled in the art is familiar.

What is claimed is:

1. A process for producing a monolithic silicon SPM sensor comprising a holding element (4), a cantilever (18) and a sensor tip (21) which projects out of a surface of the cantilever and is delimited by three surfaces, comprising the following steps:

A) oxidation of a monocrystalline (100)-silicon wafer (1) to produce an oxide layer (3) on an underside and a top side of the wafer;

B) pre-patterning of a holding element (4) and of a cantilever (18) from the underside of the wafer (1);

C) forming a free end of the cantilever (18) and two sides (14, 15) of a sensor tip (21) by patterning from the underside of the wafer; and D) production of the cantilever (18) and of the sensor tip (21) by thinning of the remaining substrate material from the top side of the wafer.

2. The process as claimed in claim 1, wherein step B comprises:

photolithographic fabrication of the holding element (4) in the oxide layer (3) on the underside; and wet-chemical etching of the wafer underside in order to produce the holding element (4) and a silicon membrane (6) for what will subsequently be the cantilever (18).

3. The process as claimed in claim 2, wherein step C comprises:

oxidation of the pre-patterned silicon wafer and application of a silicon nitride layer (8) to the wafer top side;

fabrication of a mask for patterning boundary surfaces (14, 15) of the free end of the cantilever;

fabrication of a mask for patterning of the cantilever (18);

production of the tip of the cantilever (18) and fabrication of a recess (13) by deep silicon etching, wherein the depth of the recess at least corresponds to the desired height of the sensor tip (21) plus the thickness of the cantilever (18) which is to be formed;

production of the cantilever (18) by thinning of the substrate material in the recess (13) and laterally with respect to the boundary surfaces (14, 15) of the cantilever (18); and removal of the silicon nitride layers (8) and of the oxide layers.

4. The process as claimed in claim 3, wherein the production of the mask for the patterning of the boundary surfaces of the free end of the cantilever comprises:

application and patterning of a photoresist on the wafer underside, transfer of the photomask and removal of the uncovered silicon oxide layer and subsequent removal of the photoresist.

5. The process as claimed in claim 4, wherein the production of a mask by patterning of the cantilever comprises:

application and patterning of a photoresist on the pre-patterned wafer underside, transfer of the photomask into the silicon oxide layer and subsequent removal of the photoresist, the silicon oxide layer being partially thinned and a step (10) being formed in the silicon oxide layer.

6. The process as claimed in claim 3, wherein the production of the cantilever comprises:

oxidation of the silicon wafer;

removal of the silicon oxide layer formed on the base surface (17) of the recess (13) and transfer of the cantilever mask to the wafer underside by means of a targeted oxide dry-etching process which operates selectively with respect to silicon; and wet-chemical etching of the wafer underside with an etching depth which exceeds the thickness of the cantilever to be fabricated.

7. The process as claimed in claim 1, wherein step D comprises:

selective dry etching of the wafer top side and removal of the silicon oxide layer (2);

wet-chemical etching of the silicon wafer on the wafer top side and stopping the operation when the desired thickness of the cantilever (18) is reached; and wet-chemical removal of the remaining silicon oxide layers.

* * * * *